June 11, 1963 W. R. POLANIN 3,093,214
SELF-CONTAINED BRAKE
Filed July 31, 1961 3 Sheets-Sheet 2

Witness:
C H Barrett

INVENTOR.
Walter R. Polanin
BY Walter L. Schlegel, Jr.
Atty.

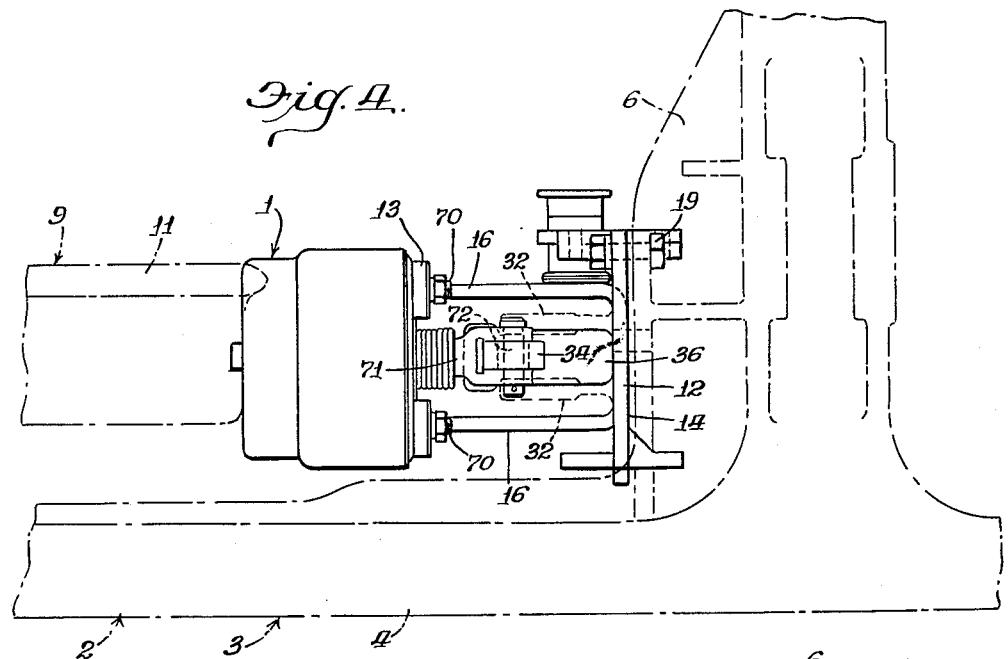
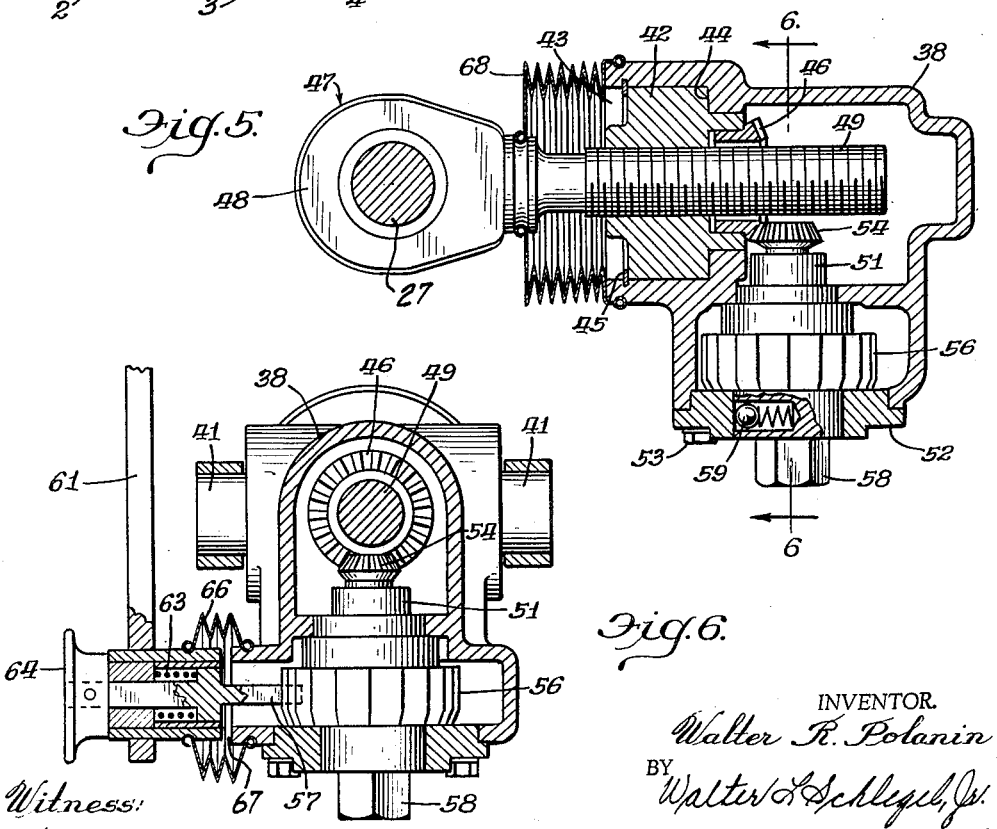

United States Patent Office 3,093,214
Patented June 11, 1963

3,093,214
SELF-CONTAINED BRAKE
Walter R. Polanin, Hammond, Ind., assignor to Amsted Industries Incorporated, Chicago, Ill., a corporation of New Jersey
Filed July 31, 1961, Ser. No. 128,125
12 Claims. (Cl. 188—153)

This invention relates to tread brakes for railway cars and more particularly to self-contained package brake structures adapted for use on passenger cars of lightweight, high speed trains.

Briefly, the present invention contemplates the provision of a self-contained brake structure adapted to be mounted on the frame of a railway car truck and embodying a brake shoe to frictionally engage the tread of a wheel to decelerate rotation of the wheel, the shoe being connected to a lever which is actuated by a pneumatic power cylinder. To take up slack, due to wear of the brake shoe, a slack adjuster mechanism is provided to interconnect the lever and brake shoe.

An object of the present invention is to provide a self-contained brake which is relatively inexpensive in construction and reliable in operation.

Another object of the invention resides in the provision of a self-contained package brake structure adapted to be readily mounted upon a truck frame and within the limited available space adjacent a wheel of the truck.

A further object of the invention resides in the provision of a self-contained brake in which the several parts are formed and arranged to facilitate inspection, repair and replacement of parts.

Another object of the invention resides in the provision of a self-contained brake embodying a slack adjuster automatically operable to limit the movement of the brake shoe relative to the tread surface of a wheel.

Another object of the invention resides in the provision of a slack adjuster device which is inexpensive to manufacture and assemble and reliable in use on a self-contained brake structure.

The invention embodies other novel features, details of construction and arrangement of parts which are hereinafter set forth in the specification and claims and illustrated in the accompanying drawings, forming part thereof, wherein:

FIGURE 4 is a top plan view of the brake structure;

FIGURE 5 is a sectional view illustrating the slack adjuster;

FIGURE 6 is a transverse section taken along the line 6—6 of FIGURE 5.

Figure 1:
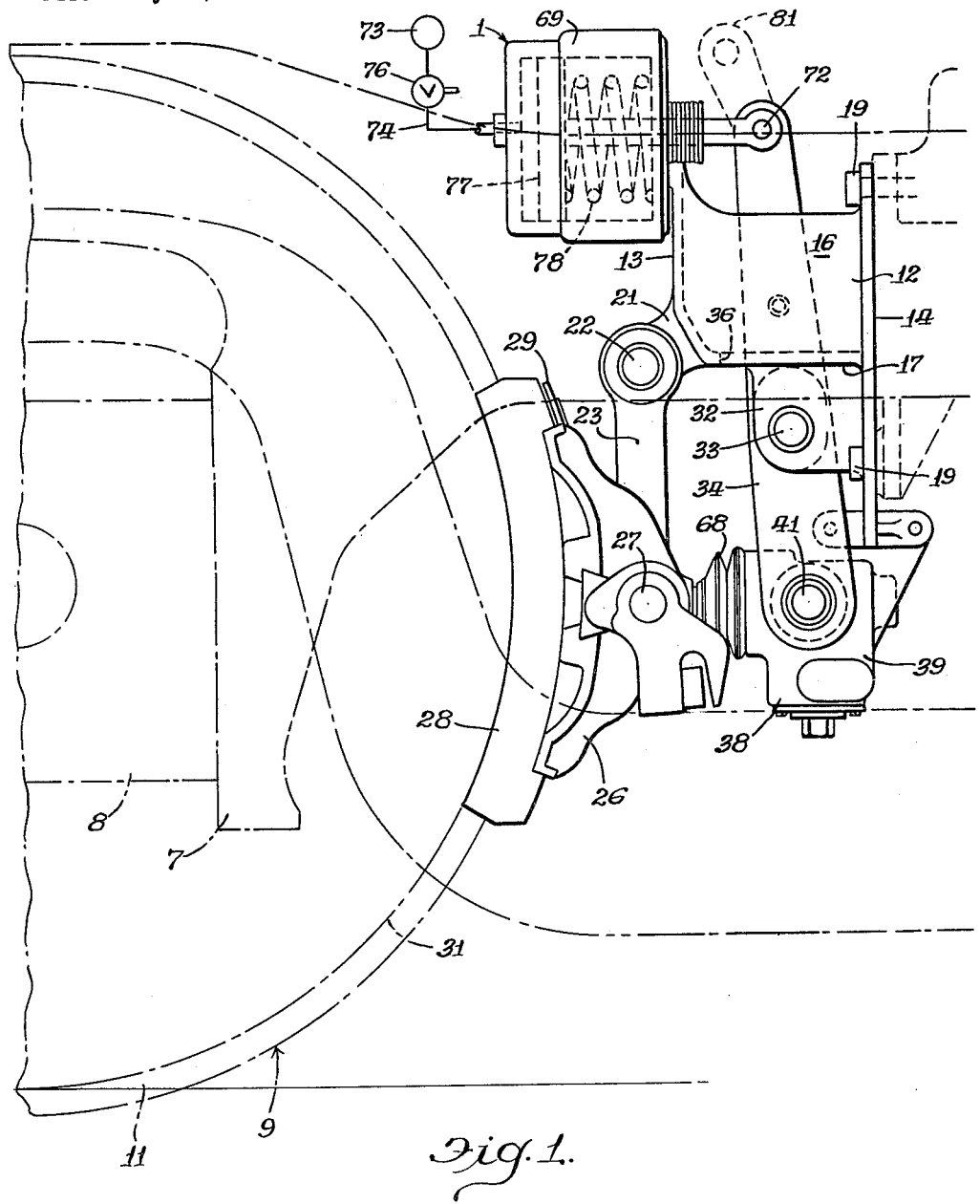
FIGURE 1 is a side elevation illustrating a self-contained brake structure embodying features of the invention.
Figure 2:
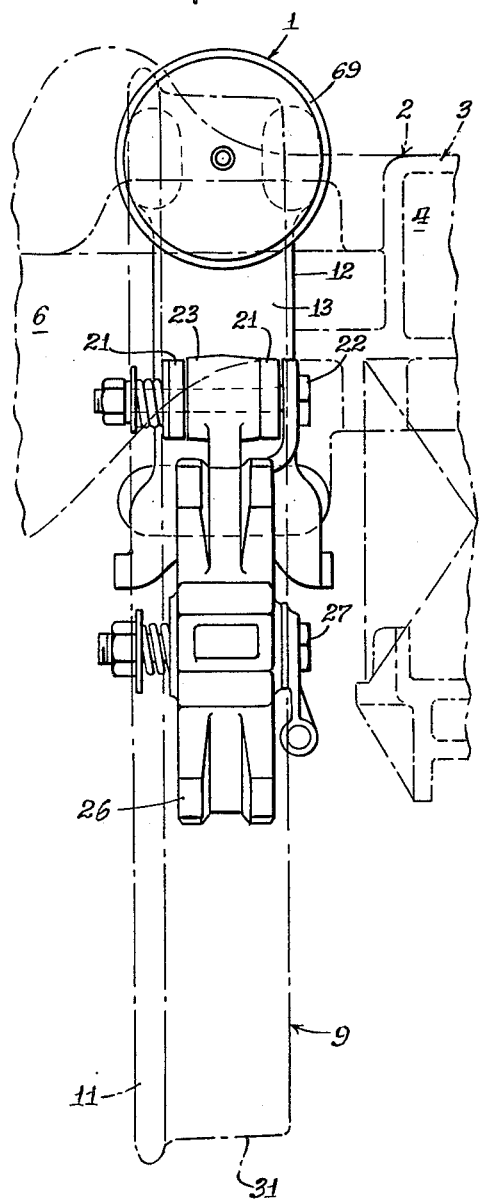
FIGURE 2 is a front elevation of the brake structure.

Referring now to the drawings for a better understanding of the invention, the self-contained brake structure 1 is shown as arranged on a railway truck 2 embodying a truck frame 3 having side rails 4 interconnected by transoms 6, the side rails having pedestal jaws 7 adjacent their ends to receive journal boxes 8 having wheel and axle asemblies 9 journaled therein. On a conventional four wheel railway car truck, it will be understood that a self-contained brake structure is provided for each wheel 11. The self-contained brake structure 1 is shown as comprising a support bracket 12 having front and back walls 13 and 14 interconnected by side walls 16—16 and a bottom wall 17. The back wall 14 is provided with apertures 18 to receive bolts or cap screws 19 for detachably mounting the bracket on a transom 6.

A pair of spaced hanger support lugs 21 projects forwardly from the front wall 13 and is formed with axially aligned bearing apertures to receive a pin 22. A hanger 23 is pivotally mounted at its upper end on the pin 22 between the lugs 21, the lower end of the hanger being pivotally connected to brake head 26 by means of a pin 27. A brake shoe 28 is detachably secured on the brake head 26 by a conventional key 29 for movement into and out of frictional engagement with the tread surface 31 of the wheel 11.

Figure 3:
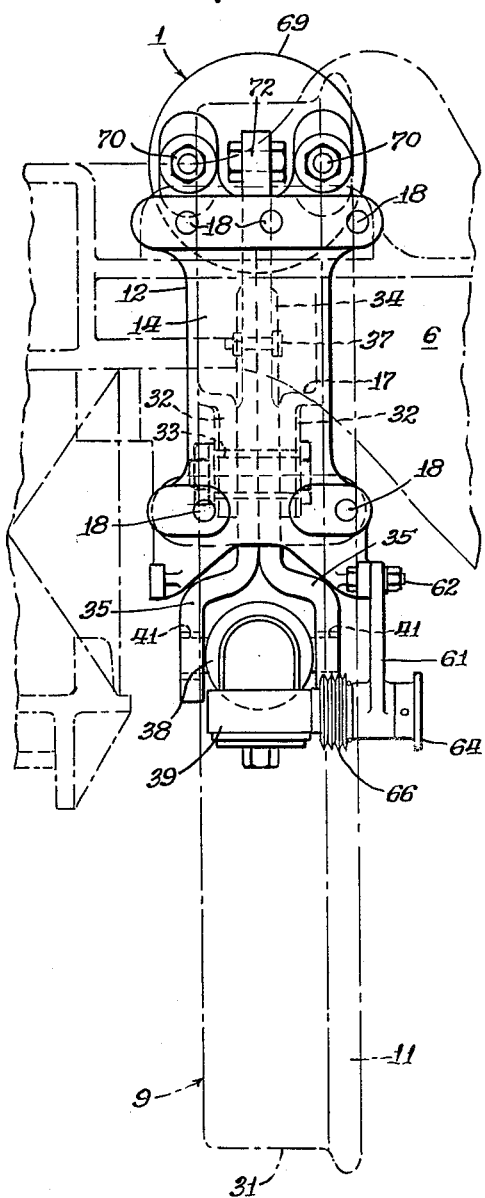
FIGURE 3 is a rear elevation of the brake structure.

A pair of spaced gussets 32 extends between the back wall 14 and bottom wall 17 and is formed with axially aligned apertures to receive a pivot pin 33. A brake lever 34 extends vertically between the gussets 32 and is pivotally mounted intermediate its ends on the pivot pin 33. A slot 36 is formed in the bottom wall 17 between the gussets 32 to receive the brake lever which may be formed of two identical members 35 secured together by a bolt 37, as shown in FIGURE 3, to provide a brake lever having a bifurcated lower end to straddle the housing 38 of a slack adjuster device 39.

Trunnions 41 are provided on opposite sides of the housing 38 for pivotal movement in axially aligned apertures formed in the lower ends of the brake lever members 35. An internally threaded adjusting nut 42 is mounted for rotational movement in a longitudinal passage 43 in the housing 38 between a shoulder 44 and a split ring retainer 45, the inner end of the nut having a cylindrical bore to tightly receive the hub portion of a driven bevel gear 46. The gear 46 is secured against movement relative to the nut by suitable fastening means, such as pins or set screws.

An adjustment screw 47 is formed with an eye portion 48 and a threaded shank 49, the eye portion being pivotally connected to the brake head 26 by means of the bolt 27, and the shank being in threaded engagement with the adjusting nut 42. A rotatable ratchet member 51 is journaled at its inner end in the housing 38 and is journaled at its outer end on a cover 52 secured to the housing by means of screws 53. A driving bevel gear 54 is fixed on the inner end of the ratchet member for meshing engagement with the bevel gear 46.

The portion of the member 51 disposed adjacent the inner side of the cover 52 is formed with circumferentially spaced ratchet teeth 56 adapted to be engaged by the inner end of a pawl 57. To permit manual rotation, the ratchet member 51 is provided with a hexagonal boss 58 adapted to be engaged by a wrench. To resist accidental rotation, the member 51 is provided with a spring-pressed ball 59 to frictionally engage the cover 52.

The pawl 57 is mounted for axial movement in a pawl support bracket 61 secured to the bracket 12 by means of cap screws 62. A helical compression spring 63 is provided on the bracket 61 to yieldably resist movement of the pawl 57 out of engagement with the ratchet teeth 56, and a hand knob 64 is provided on the outer end of the pawl to manually move the pawl away from the ratchet teeth.

A resilient boot 66 is provided to enclose the pawl 57 between the housing 38 and bracket 61 to prevent the passage of dirt and moisture through the pawl opening 67 in the housing. A similar resilient boot 68 is also provided to enclose the shank 49 between the eye portion 48 and the housing 38 to prevent the passage of dirt or moisture into the housing.

A power cylinder 69 is secured by studs and nuts 70 to the upper end of the front wall 13 and provided with a piston rod 71 pivotally connected to the upper end of the brake lever 34 by a pivot pin 72, the cylinder being connected to a source 73 of pressurized fluid by a conduit 74 having a 3-way control valve 76 therein. The rod 71 is secured to a piston 77 which is slidably mounted in the cylinder 69 and biased to its retracted position by a helical compression spring 78.

In the operation of the self-contained brake mechanism thus shown and described, pressurized fluid passing into the cylinder 69 from the conduit 74 causes the piston 77 to pivot the brake lever 34 in a clockwise direction, as shown in FIGURE 1, and thereby move the brake shoe 28 into engagement with the tread surface 31 of the wheel 11. When the valve 76 is operated to exhaust fluid from the cylinder 69 to atmosphere, the spring 78 acts to move the piston to its retracted position to thereby pivot the brake lever 34 in a counter-clockwise direction to move the brake shoe out of engagement with the tread surface 31 of the wheel 11.

When the brake mechanism is operated to move the brake shoe 28 relative to the wheel, the ratchet member 51 is also moved back and forth relative to the pawl 57. Prior to wear of the brake shoe, the pawl 57 is moved into and out of engagement with the same tooth 56 on the ratchet member. As the shoe 28 becomes worn to a reduced thickness, the ratchet member 51 moves closer to the wheel 11 during application of the brake and eventually causes the pawl to engage back of another tooth on the ratchet member and to rotate the latter through an arc corresponding to the distance between adjacent teeth during release movement of the brake.

The ratchet member 51 is thus moved step-by-step during wear of the brake shoe and acts through the gears 54 and 46 to rotate the adjusting nut 42 which acts to move the adjusting screw 47 outwardly from the housing 38 toward the wheel 11. The adjusting screw 47 is thus moved axially step-by-step from the housing 38 responsive to wear of the brake shoe to thereby reduce slack and maintain a predetermined range of travel of the brake shoe relative to the wheel tread 31.

If desired, the brake lever 34 may be provided at its upper end with an extension 81 adapted to be connected to a manually operative brake applying device.

I claim:

1. In a self-contained tread brake for a railway car having a truck frame supported on wheel and axle assemblies, a support bracket adapted to be mounted on a truck frame, a hanger pivotally connected to said bracket, a brake head-shoe assembly pivotally supported on said hanger to engage a wheel, a brake lever pivotally mounted intermediate its end on said bracket, a slack adjuster device comprising a housing pivotally mounted on the lower end of said brake lever, an adjustment screw pivotally connected to said brake head-shoe assembly, a rotatable ratchet member journaled in said housing and having teeth thereon, a reciprocable pawl mounted on said bracket and projecting into said housing to engage said teeth and rotate said ratchet member responsive to movement of said brake lever, means journaled in said housing operable responsive to rotation of said member to move said adjustment screw to increase the spacing between the brake lever and the brake head-shoe assembly to reduce slack, and a power cylinder unit mounted on said bracket and having a piston rod pivotally connected to the upper end of said brake lever.

2. In a self-contained tread brake for a railway car having a truck frame supported on wheel and axle assemblies, a support bracket adapted to be mounted on a truck frame, a hanger pivotally connected to said bracket, a brake head-shoe assembly pivotally supported on said hanger to engage a wheel, a brake lever pivotally mounted intermediate its end on said bracket, a slack adjuster device comprising a housing pivotally mounted on the lower end of said brake lever, an adjustment screw pivotally connected to said brake head-shoe assembly, a rotatable ratchet member journaled in said housing and having teeth thereon, a reciprocable pawl mounted on said bracket and projecting into said housing to engage said teeth and rotate said ratchet member responsive to movement of said brake lever, means journaled in said housing operable responsive to rotation of said member to move said adjustment screw to increase the spacing between the brake lever and the brake head-shoe assembly to reduce slack, and a power cylinder unit mounted on said bracket and having a piston rod pivotally connected to the upper end of said brake lever, said means comprising an adjustment nut journaled for rotational and non-axial movement in said housing and in threaded engagement with said adjustment screw.

3. In a self-contained tread brake for a railway car having a truck frame supported on wheel and axle assemblies, a support bracket adapted to be mounted on a truck frame, a hanger pivotally connected to said bracket, a brake head-shoe assembly pivotally supported on said hanger to engage a wheel, a brake lever pivotally mounted intermediate its end on said bracket, a slack adjuster device comprising a housing pivotally mounted on the lower end of said brake lever, an adjustment screw pivotally connected to said brake head-shoe assembly, a rotatable ratchet member journaled in said housing and having teeth thereon, a reciprocable pawl mounted on said bracket and projecting into said housing to engage said teeth and rotate said ratchet member responsive to movement of said brake lever, an adjusting nut journaled in said housing and operable responsive to rotation of said member to move said adjustment screw to increase the spacing between the brake lever and the brake head-shoe assembly to reduce slack, a power cylinder unit mounted on said bracket and having a piston rod pivotally connected to the upper end of said brake lever, and bevel gears interconnecting said ratchet member and adjusting nut for common rotational movement.

4. In a self-contained tread brake for a railway car having a truck frame supported on wheel and axle assemblies, a support bracket adapted to be mounted on a truck frame, a hanger pivotally connected to said bracket, a brake head-shoe assembly pivotally supported on said hanger to engage a wheel, a brake lever pivotally mounted intermediate its end on said bracket, a slack adjuster device comprising a housing pivotally mounted on the lower end of said brake lever, an adjustment screw pivotally connected to said brake head-shoe assembly, a rotatable ratchet member journaled in said housing and having teeth thereon, a reciprocable pawl mounted on said bracket and projecting into said housing to engage said teeth and rotate said ratchet member responsive to movement of said brake lever, an adjusting nut journaled in said housing and operable responsive to rotation of said member to move said adjustment screw to increase the spacing between the brake lever and the brake head-shoe assembly to reduce slack, a power cylinder unit mounted on said bracket and having a piston rod pivotally connected to the upper end of said brake lever, said pawl being mounted for axial movement along a line of travel normal to the axis of rotation of the ratchet member, a resilient means to yieldably resist axial movement of said pawl, and means for manually moving said pawl out of engagement with said teeth.

5. In a self-contained tread brake for a railway car having a truck frame supported on wheel and axle assemblies, a support bracket adapted to be mounted on a truck frame, a hanger pivotally connected to said bracket, a brake head-shoe assembly pivotally supported on said hanger to engage a wheel, a brake lever pivotally mounted intermediate its end on said bracket, a slack adjuster device comprising a housing pivotally mounted on the lower end of said brake lever, an adjustment screw pivotally connected to said brake head-shoe assembly, a rotatable ratchet member journaled in said housing and having teeth thereon, a reciprocable pawl mounted on said bracket and projecting into said housing to engage said teeth and rotate said ratchet member responsive to movement of said brake lever, an adjusting nut journaled in said housing and operable responsive to rotation of said member to move said adjustment screw to increase the spacing between the brake lever and the brake head-shoe assembly to reduce slack, a power cylinder unit mounted on said bracket and having a piston rod pivotally connected to the upper end of said brake lever, and means on said ratchet member for manually rotating the latter.

6. In a self-contained tread brake for a railway car having a truck frame supported on wheel and axle assemblies, a support bracket adapted to be mounted on a truck frame, a hanger pivotally connected to said bracket, a brake head-shoe assembly pivotally supported on said hanger to engage a wheel, a brake lever pivotally mounted intermediate its end on said bracket, a slack adjuster device pivotally mounted on the lower end of said brake lever and pivotally connected to said brake head-shoe assembly, said device comprising a rotatable ratchet member having teeth thereon, a pawl mounted on said bracket to engage said teeth and rotate said ratchet member responsive to movement of said brake lever, means operable responsive to rotation of said member to increase the spacing between the brake lever and the brake head-shoe assembly to reduce slack, and a power cylinder unit mounted on said bracket and having a piston rod pivotally connected to the upper end of said brake lever, said means comprising an adjustment nut journaled for rotational and non-axial movement, and an adjustment screw in threaded engagement with said nut and in pivotal engagement with said brake head-shoe assembly, said brake lever having a bifurcated lower end, said device comprising a housing having trunnions journaled in said end, said adjustment nut being journaled in said housing.

7. In a self-contained tread brake for a railway car having a truck frame supported on wheel and axle assemblies, a support bracket adapted to be mounted on a truck frame, a hanger pivotally connected to said bracket, a brake head-shoe assembly pivotally supported on said hanger to engage a wheel, a brake lever pivotally mounted intermediate its end on said bracket, a slack adjuster device pivotally mounted on the lower end of said brake lever and pivotally connected to said brake head-shoe assembly, said device comprising a rotatable ratchet member having teeth thereon, a pawl mounted on said bracket to engage said teeth and rotate said ratchet member responsive to movement of said brake lever, means operable responsive to rotation of said member to increase the spacing between the brake lever and the brake head-shoe assembly to reduce slack, and a power cylinder unit mounted on said bracket and having a piston rod pivotally connected to the upper end of said brake lever, said adjustment nut and said ratchet member being journaled in a housing pivotally mounted on said brake lever.

8. In a self-contained tread brake for a railway car having a truck frame supported on wheel and axle assemblies, a support bracket adapted to be mounted on a truck frame, a hanger pivotally connected to said bracket, a brake head-shoe assembly pivotally supported on said hanger to engage a wheel, a brake lever pivotally mounted intermediate its end on said bracket, a slack adjuster device pivotally mounted on the lower end of said brake lever and pivotally connected to said brake head-shoe assembly, said device comprising a rotatable ratchet member having teeth thereon, a pawl mounted on said bracket to engage said teeth and rotate said ratchet member responsive to movement of said brake lever, means operable responsive to rotation of said member to increase the spacing between the brake lever and the brake head-shoe assembly to reduce slack, a power cylinder unit mounted on said bracket and having a piston rod pivotally connected to the upper end of said brake lever, means on said ratchet member for manually rotating the latter, and means for manually moving said pawl away from said ratchet member for manual adjustment of said device, said adjustment nut and ratchet member being journaled for common rotational movement in a housing pivotally mounted on said brake lever.

9. In a self-contained tread brake adapted to be mounted on a railway car truck frame to decelerate a wheel, a support bracket, a brake lever pivotally mounted intermediate its ends on said bracket and having a bifurcated lower end, a slack adjuster housing having trunnions journaled in said lever end, a brake head-shoe assembly pivotally suspended from said bracket, an adjustment screw pivotally connected to said assembly, screw adjusting means operable responsive to pivotal movement of said lever to move said screw step-by-step axially from said housing, means to actuate said lever to move said assembly into and out of braking engagement with a wheel, said screw adjusting means comprising a nut mounted for rotational and non-axial movement in said housing, a ratchet member journaled in said housing to rotate said nut, and a pawl mounted on said bracket and projecting into said housing to rotate said ratchet member.

10. In a brake for a railway car truck having a truck frame structure supported by a wheel and axle assembly; the combination of a brake lever; pivot means pivotally mounting said lever intermediate its ends on said structure, said lever having a portion below said pivot means; a brake head-shoe assembly for decelerating said wheel and axle assembly; a slack adjuster comprising a housing element, a screw element, and adjusting means in the housing element operable responsive to pivotal movement of the lever to move said screw element step-by-step axially from the housing element; one of said elements being pivoted to the brake head-shoe assembly, and the other of said elements being pivoted to said lever portion; said screw adjusting means comprising a nut threaded on the screw element and mounted for rotational and non-axial movement in the housing element, a ratchet member journalled in said housing element and operatively connected to the nut for rotating the latter, and a pawl mounted on said structure and projecting into said housing element to rotate said ratchet member.

11. In a brake for a railway car truck having a truck frame structure supported by a wheel and axle assembly; the combination of a brake lever pivotally mounted on said structure, a brake head-shoe assembly actuated by said lever for decelerating said wheel and axle assembly, a slack adjuster comprising a housing element, a screw element, and adjusting means in the housing element operable responsibe to pivotal movement of the lever to move said screw element step-by-step axially from the housing element; one of said elements being pivoted to the brake head-shoe assembly, and the other of said elements being pivoted to said lever, said screw adjusting means comprising a nut threaded on the screw element and mounted for rotational and non-axial movement in the housing element, a ratchet member journalled in said housing element and operatively connected to the nut for rotating the latter, and a pawl mounted on said structure and projecting into said housing element to rotate said ratchet member.

12. In a brake for a railway car truck having a truck frame structure supported by a wheel and axle assembly; the combination of a brake lever; pivot means pivotally mounting said lever intermediate its ends on said structure, said lever having a portion below said pivot means; a brake head-shoe assembly for decelerating said wheel and axle assembly; a slack adjuster comprising a housing element, a screw element, and adjusting means in the housing element operable responsive to pivotal movement of the lever to move said screw element step-by-step axially from the housing element; one of said elements being pivoted to the brake head-shoe assembly, and the other of said elements being pivoted to said lever portion; said screw adjusting means comprising a nut threaded on the screw element and mounted for rotational and non-axial movement in the housing element, a ratchet member journalled in said housing element, bevel gears operatively connecting the ratchet member to the nut for rotating the latter, a pawl slidably mounted on said structure and projecting into said housing element to rotate said ratchet member, means to manually move said pawl out of engagement with said ratchet member, and means provided on the ratchet member and projecting outwardly from the housing element for manually rotating the ratchet member.

References Cited in the file of this patent

UNITED STATES PATENTS

| | | |
|---|---|---|
| 2,940,553 | Newell et al. | June 14, 1960 |
| 2,981,381 | Swift | Apr. 25, 1961 |

FOREIGN PATENTS

| | | |
|---|---|---|
| 647,046 | Great Britain | Dec. 6, 1950 |